Figure 2:
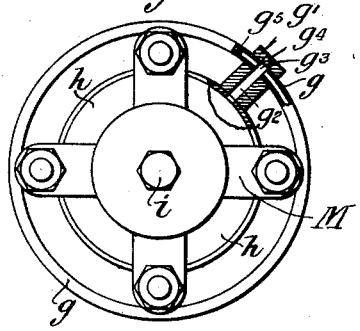

No. 737,728. PATENTED SEPT. 1, 1903.
H. A. FLEUSS.
APPARATUS FOR CONTROLLING LEVEL OF WATER IN STEAM BOILERS.
APPLICATION FILED JUNE 23, 1902.
NO MODEL. 4 SHEETS—SHEET 1.

Witnesses.
A. M. Parkins.
M. M. O'Connor.

Inventor.
Henry Albert Fleuss,
By his Attorneys,
Baldwin, Davidson & Wight

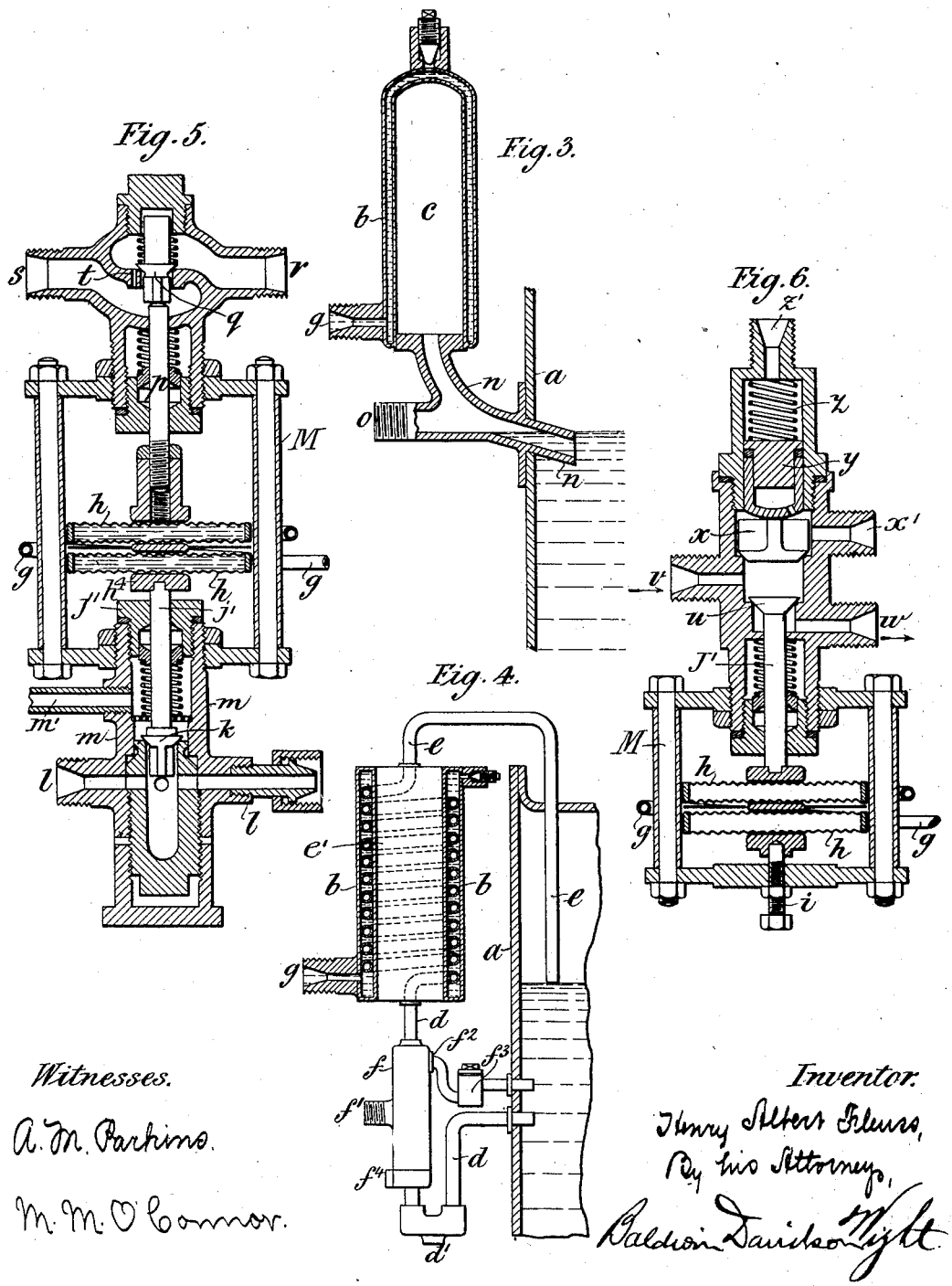

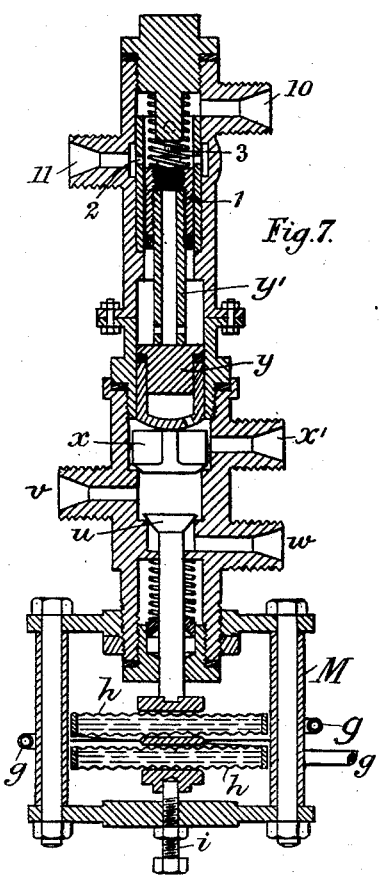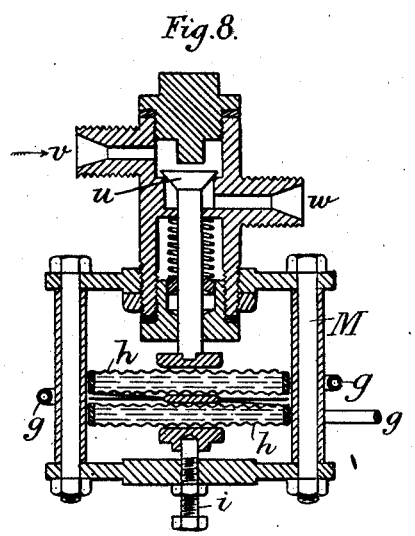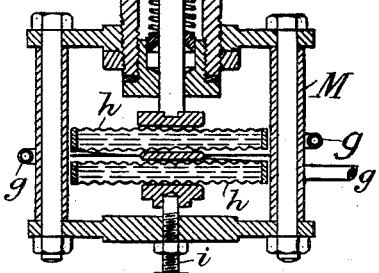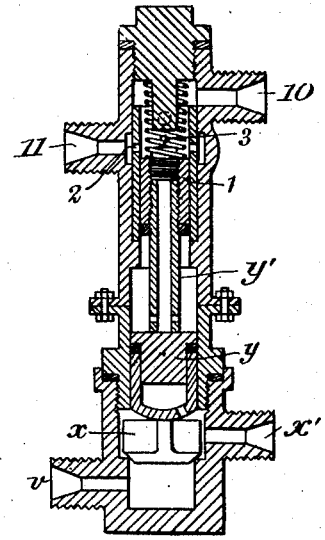

No. 737,728. PATENTED SEPT. 1, 1903.
H. A. FLEUSS.
APPARATUS FOR CONTROLLING LEVEL OF WATER IN STEAM BOILERS.
APPLICATION FILED JUNE 23, 1902.
NO MODEL. 4 SHEETS—SHEET 4.
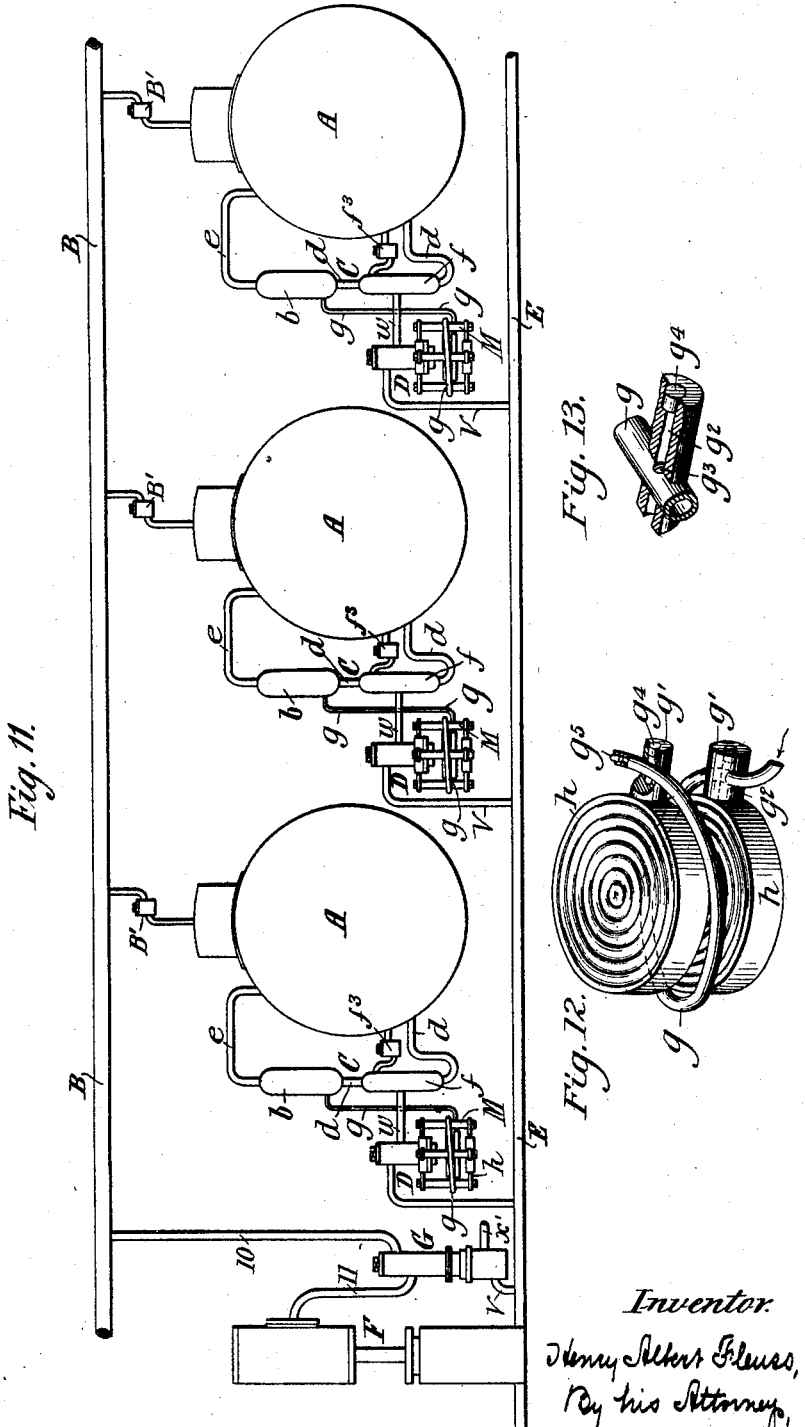

No. 737,728. Patented September 1, 1903.

UNITED STATES PATENT OFFICE.

HENRY ALBERT FLEUSS, OF STAINES, ENGLAND.

APPARATUS FOR CONTROLLING LEVEL OF WATER IN STEAM-BOILERS.

SPECIFICATION forming part of Letters Patent No. 737,728, dated September 1, 1903.

Application filed June 23, 1902. Serial No. 112,875. (No model.)

*To all whom it may concern:*

Be it known that I, HENRY ALBERT FLEUSS, engineer, a subject of the King of Great Britain, residing at The Priory, Knowle Green, Staines, in the county of Middlesex, England, have invented a certain new and useful Improvement in Apparatus for Controlling the Level of Water in Steam-Boilers, of which the following is a specification.

This invention relates to apparatus in which a thermostatic appliance outside a steam-boiler and used for controlling the delivery of feed-water to the boiler is either heated by steam from the boiler being allowed to come into contact with it when the water-level in the boiler is too low or is allowed to cool when steam is shut off from it by the water rising to the required level.

For the thermostat I use a closed vessel, (nearly filled with water or other vaporizable liquid,) with which steam from the boiler is brought into contact whenever the water-level in the boiler is too low, and connect the interior of this vessel by a pipe with the interior of a closed case which expands or alters its form when subjected to internal pressure and then acts on a valve to cause water to be supplied to the boiler.

The closed vessel I make annular in cross-section, so that its internal capacity is small as compared with the area of its outer surface. This small amount of water can be rapidly heated by being exposed to a large surface heated by steam from the boiler whenever the water-level gets too low and is also at all times more or less cooled by reason of part or the whole of the outer surface of the vessel being exposed to air or other cooling medium.

The outer exterior surface of the annular closed vessel may be exposed to air, while the space in the center of the annular closed vessel may be closed at its ends and the inclosed central space form a chamber into which steam or water enters as the water-level in the boiler rises or falls, or both the outer and inner exterior surface of the annular closed vessel may be exposed to air and the liquid contained in the vessel be heated by a coil of pipe which nearly fills the vessel and to which steam enters whenever the water-level in the boiler gets too low.

In order that a very slight rise or fall of the water-level in the boiler may cause either steam or water to be brought into contact with the thermostatic mechanism, I cause a pipe to be led upward from the lower part of the boiler below the water-level and a continuation of this pipe to be led downward into the interior of the upper part of the boiler and to terminate at the water-level. The portion of this pipe above the water-level will therefore be full of steam or water, according as the lower end of the descending portion of the pipe is above or below the water-level.

Where the steam or water is to come into contact with the thermostat, the pipe may be enlarged and there form the inner wall of the annular closed vessel above mentioned, or the pipe may be formed into a coil to occupy the greater part of the interior of the annular closed vessel. In order that when this enlarged or coiled portion of the pipe fills with water that the water may be comparatively and not highly-heated water from the boiler, I cause the pipe which is led outward from the boiler below the water-level to be first led for a distance downward before being led upward, so that the water in the upwardly-ascending portion of the pipe may remain comparatively cool, so that when steam in the enlarged or coiled portion of the pipe condenses and water is consequently drawn up into this coiled or enlarged portion the water drawn up into it may be cool and not heated water, so that the action of the thermostat may not be delayed. To further insure that the water so drawn up into the coiled or enlarged portion of the pipe shall be cool water, the portion of the pipe which leads upward to this coiled or enlarged portion may be surrounded by a jacket through which the feed-water on its way to the boiler is forced to pass.

My improvements are shown in the drawings annexed, wherein—

Figure 1:
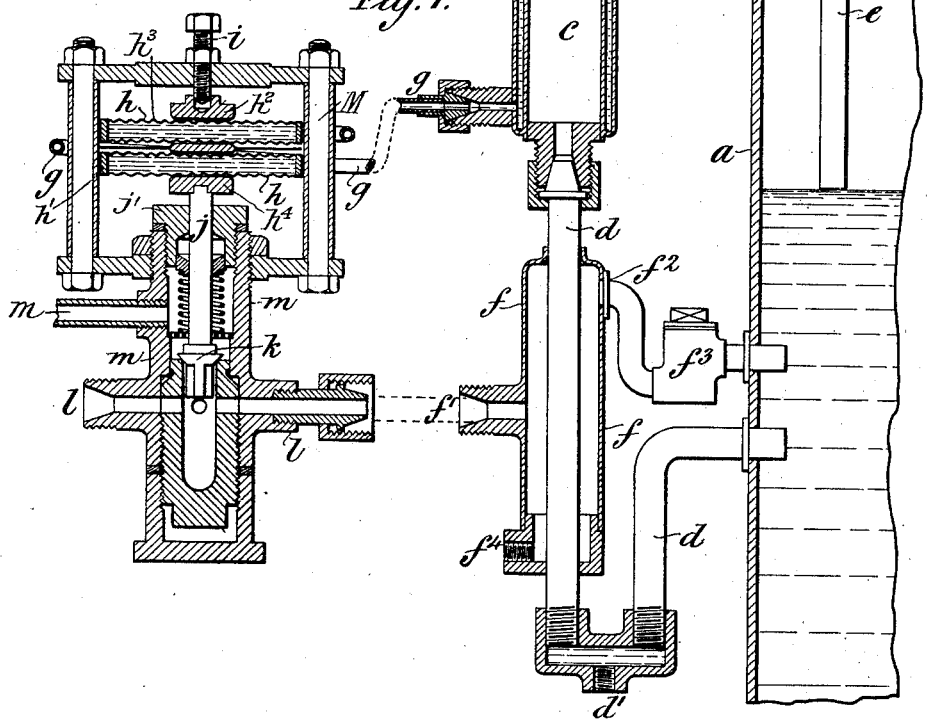

Figure 1 is a vertical section of part of a steam-boiler and feed-water-supply mechanism such as above described, in which the thermostatic mechanism is used for closing a relief-valve on the feed-water-supply pipe and provision is made for causing a very slight rise or fall of the water-level in the boiler to change the action of the thermostat.

Fig. 2 is a plan view, with parts broken away, of part of Fig. 1. Fig. 3 is a vertical section of an alternative arrangement for the right-hand half of Fig. 1. Fig. 4 shows another alternative arrangement in which the liquid contained in the annular chamber is heated by steam entering a coiled portion of the pipe from the boiler, which nearly fills the interior of the chamber. Fig. 5 is a vertical section of an arrangement in which whenever a feed-water-relief valve such as shown in Fig. 1 is made to close it at the same time opens a steam-valve for supplying steam to the steam-engine used for working the feed-water-supply pump. Fig. 6 is a vertical section of an arrangement in which the expansible cases are used for opening a feed-water-admission valve for admitting feed-water to a boiler, a relief-valve being in this case used for allowing the feed-water to pass away whenever the feed-water-admission valve is closed. Fig. 7 is a vertical section of a similar arrangement in which whenever the relief-valve opens it shuts off steam from the steam-pump. Figs. 8 and 9 are vertical sections showing the feed-water-admission valve and the feed-water-relief valve, each separate one from the other. Fig. 10 is a vertical section showing relief-valve mechanism such as shown in Fig. 9, adapted for closing a steam-supply valve whenever the relief-valve opens. Fig. 11 is a diagram view of a number of steam-boilers all supplied with feed-water from one feed-pump by the above means. Fig. 12 is a perspective diagram view of two of the expansible cases, showing the manner in which they are connected. Some parts are broken away in order to better illustrate other parts. Fig. 13 is a detail view showing the manner of connecting the coiled pipe with the expansible cases.

In Fig. 1, $a$ represents a portion of a steam-boiler, and $b$ a small vertical closed annular vessel outside the boiler. The central cylindrical space surrounded by this annular vessel is closed at top and bottom and forms a chamber $c$. A pipe $d$ connects the bottom of the chamber $c$ with the boiler below the water-level, and a pipe $e$ is led off from the top of the chamber $c$ to the upper part of the boiler and its end brought down to the water-level. The pipe $d$ is shown to be extended for a distance downward and then upward for some distance before it is led into the boiler. Surrounding a portion of the pipe $d$ is a jacket $f$. Feed-water is passed into this jacket through the inlet $f'$ and passes out by the outlet $f^2$ past a non-return valve at $f^3$ and then into the boiler below the water-level. A blow-off cock may be fitted at $f^4$ to blow off any sediment which may collect in the jacket, and similarly a blow-off cock may be fitted at $d'$ to keep the pipe $d$ free from sediment. $g$ is a pipe led off from the bottom of the annular vessel $b$ to hermetically-closed expansible metallic cases $h$. Both these cases and the annular vessel $b$ are filled with water or other vaporizable liquid, so that when pressure is generated in the vessel $b$ there is a corresponding pressure within the cases $h$. Each case $h$ is formed of two corrugated disks $h^3$ of thin metal securely soldered at a distance apart from one another to a stout metal ring $h'$. The way in which the pipe $g$ is made to communicate with the interior of each case is clearly shown in Figs. 2, 12, and 13. The pipe $g$ is, as shown, bent into a coil in order that it may spring and allow the cases $h$ to rise or fall freely whether one or any other number of cases are used. Each of the cases $h$ is provided with a boss $g'$. The pipe $g$ from the annular vessel $b$ is passed through the boss $g'$ of the lower case and is then coiled once around the cases, as indicated clearly in Fig. 12. It is then passed through the boss $g'$ of the upper case $h$. Then the boss $g'$ is bored at $g^2$, and the hole is made to pass through the pipe $g$, as indicated at $g^3$. The hole $g^2$ then has its end closed by a stopper $g^4$. In like manner the boss $g'$ of the upper case is bored and a similar hole is made in the pipe $g$, as illustrated in Fig. 2 and also in Fig. 12. The outer end of the hole is closed by a stopper $g^4$, and the end of the pipe $g$ is also closed by a stopper $g^5$, as indicated in Fig. 12 and also in Fig. 2. In this latter figure the upper boss $g'$ is shown and the upper end of the pipe $g$ is shown in section. By the construction described it will be understood that the fluid from the vessel $b$ will enter as indicated by the arrow in Fig. 12 and may pass to the lower case $h$ through the opening in the boss. It will also pass through the coil and into the passage in the upper boss $g'$, and thus to the upper case $h$. The cases $h$ are placed one above another. A block $h^2$, placed above the center of the upper disk of the upper one, comes against a stop-pin $i$, while a block $h^4$, below the center of the bottom disk of the lower one, rests upon the upper end of a rod $j$, the lower end of which rests upon a valve $k$. This valve when allowed to rise from its seat allows feed-water, which is being supplied continuously to the pipe $l$, to escape into the branch $m$, from which it can be led back through an outlet-pipe $m'$, as shown, to a tank, to be again supplied to the feed-pump. At the end of the branch $m$ is a stuffing-box $J'$, through which the rod $j$ passes. This stuffing-box is only necessary when the escape-water is required to be carried up to a higher level. The stop-pin $i$ may, as shown, be carried by a frame M, screwed onto the exterior of the branch $m$. A continuation of the pipe $l$ is joined to the inlet $f'$ of the water-jacket $f$, as indicated by dotted lines.

The action is as follows: So long as the water-level in the boiler is above the end of the pipe $e$ steam cannot pass to the chamber $c$ and the annular vessel $b$ remains cool. So soon as the water-level gets below the end of the pipe $e$ steam passes through the pipe to the chamber $c$ and quickly heats the annular vessel $b$, as the amount of water or other liquid contained in it is extremely small. The pressure thereby generated in the annular vessel is transmitted through the pipe $g$ to the expansible cases $h$ and expands these cases. As they expand the upper one is prevented from rising as soon as the block upon its center comes against the stop-pin $i$. The bottom case then presses against the rod $j$ and holds the valve $k$ firmly against its seat. When this takes place, the feed-water, which is being supplied continuously to the pipe $l$, cannot escape past the valve $k$ and is compelled to pass through the water-jacket $f$ and non-return valve $f^3$, and so into the boiler. When the water-level has again risen sufficiently to shut off steam from entering the chamber $c$, the annular vessel rapidly cools, owing to the small amount of water held within it and to the large surface of its exterior which is exposed to the air, the steam previously contained in the chamber $c$ condenses, and cool water is sucked up into it from the pipe $d$. Consequently the cases $h$ again contract and the valve $k$ is allowed to open, so that excess of feed-water may escape past it and goes out through $m'$. In place of the chamber $c$ being connected with the boiler by two pipes extending from its upper and lower ends it might be connected with the boiler by a single pipe $n$, extending downward from its lower end and entering the boiler at the water-level, as indicated in Fig. 3, and the feed-water may be led into the boiler by the inlet $o$ or at any other point desired.

In place of the central space surrounded by the annular vessel $b$ being closed and connected at top and bottom with the boiler, as in Fig. 1, it might, as illustrated in Fig. 4, be open and the liquid contained in the annular vessel $b$ be heated whenever the water-level in the boiler gets too low by a coil of pipe $e'$, occupying a large portion of the interior of this annular vessel, being connected at its lower end to the pipe $d$ and at its upper end to the pipe $e$.

If in addition to using the expansible cases $h$ for closing the valve $k$ it is desired to also use them for opening a valve for admitting steam to the donkey-engine by which the feed-pump is worked, the apparatus is modified in the way shown in Fig. 5. In this modification the stop $i$ is replaced by a sliding rod $p$, the lower end of which rests on the center of the upper metallic case $h$, while its upper end comes below the stem of a steam-valve $q$. In this way when the metallic cases $h$ expand the valve $q$ is lifted and the valve $k$ closed and held down firmly onto its seat, when the lift allowed to the valve $q$ is completed. Steam supplied through the passage $r$ from the steam-boiler then passes the valve $q$ and goes by the passage $s$ to the donkey-engine.

In order that steam may never be completely cut off from the donkey-engine, a small by-pass passage $t$ may be provided, by which a limited amount of steam can always pass to it.

Fig 6 shows a modification in which the expansible cases $h$ are used for opening a feed-water-supply valve $u$ whenever the water-level in the steam-boiler gets too low. When the valve $u$ is lifted, feed-water arriving by the passage $v$ passes through the passage $w$ to the inlet $f'$ (see Fig. 1) and from thence to the boiler. $x$ is a valve by which feed-water supplied by the feed-pump can pass away at $x'$ whenever the valve $u$ is closed. The valve $x$ is normally held down onto its seat by a plunger $y$, which should be of the same diameter as the valve and is pressed downward by steam from the steam-boiler entering at $z'$ and acting upon its upper end and also by a spring $z$. The pressure of feed-water required to open the valve need only be slightly greater than the pressure in the boiler whether the pressure in the boiler be high or low.

Fig. 7 is a modification of the above arrangement in which the lifting of this relief-valve $x$ is made to cut off the supply of steam from the donkey-engine by which the feed-pump is worked. In this modification a stem $y'$, projecting downward from a cylindrical valve 1, rests on the top of the plunger $y$. When the plunger rises, the upper end of the cylindrical valve 1 closes ports 2, by which steam from the boiler entering at 10 and escaping at 11 could previously pass to the donkey-engine. A small by-pass passage 3 may be provided, so that a limited amount of steam can always pass just sufficient to keep the donkey-engine working slowly.

With a similar arrangement one feed-pump and feed-water-supply pipe may be used for supplying feed-water to a number of separate steam-boilers. In this case the supply of feed-water to each boiler from the main feed-water-supply pipe would be separately controlled, each boiler having its own feed-water-supply valve $u$, such as shown in Fig. 8, caused to open in the way described with reference to the valve $u$ in Fig. 6 whenever the water-level in that boiler got too low. One feed-water-relief valve $x$ only, such as shown in Fig. 10, should be used, this valve being normally closed by the action of steam from a steam-pipe common to all the boilers acting on the plunger $y$. This valve might be placed on the feed-water-supply pipe close up to the feed-pump. The supply of steam to the donkey-engine may also be cut off whenever this valve opens by causing it to act upon a steam-cut-off valve, such as shown in Fig. 10, in the same way as described with reference to the steam-cut-off valve shown in Fig. 7. Such an arrangement is illustrated in the diagram Fig. 11. In this diagram, A A represent a number of steam-boilers, all delivering steam into one steam-main B by connections B'. C represents an apparatus such as shown in the right-hand half of Fig. 1 applied to each boiler. D represents apparatus such as shown in Fig. 8 for permitting feed-water from a feed-water-supply pipe E to pass to each boiler whenever necessary. F is a steam-pump for supplying feed-water to the feed-water-supply pipe. G is an apparatus such as shown in Fig. 10 for allowing feed-water to escape by a relief-valve when not required for any of the boilers and at the same time closing a steam-cut-off valve for diminishing the amount of steam passing to the steam-pump.

What I claim is—

1. The combination of a steam-boiler, an annular vessel containing an annular body of vaporizable liquid outside the boiler and having part of its outer surface exposed to air or other cooling medium, means whereby the liquid in the annular vessel is heated by steam from the boiler whenever the water-level in the boiler is too low, a closed case filled with liquid and capable of altering its form when the liquid within it is subjected to pressure, a pipe also filled with liquid connecting the case with the annular vessel, and devices operated by said case.

2. The combination of a steam-boiler, an annular vessel containing an annular body of vaporizable liquid outside the boiler, the central chamber formed by closing in the ends of the central space, a pipe passing from the bottom of this chamber to the boiler below the water-level, a pipe passing from the top of the chamber into the boiler above the water-level and led downward and terminated at the water-level, a closed case filled with liquid and capable of altering its form when the liquid within it is subjected to pressure, a pipe also filled with liquid connecting the case with the annular vessel, and devices operated by said case.

3. The combination of a steam-boiler, an annular vessel containing an annular body of vaporizable liquid outside the boiler, means for bringing steam from the boiler into contact with this vessel whenever the water-level in the boiler is too low, a closed case filled with liquid and capable of altering its form when the liquid within it is subjected to pressure, a pipe also filled with liquid connecting the case with the annular vessel and a valve controlling the supply of feed-water to the boiler opened and closed by the case when it alters in form.

4. The combination of a steam-boiler, thermostatic apparatus outside the boiler, a pipe passing out from the boiler below the water-level extended upward to some distance above the water-level and there brought into contiguity with the thermostat so as to be capable of heating it, then extended downward into the boiler and terminated at the water-level and a valve controlling the supply of feed-water to the boiler opened and closed by the action of the thermostat.

5. The combination of a steam-boiler, thermostatic apparatus outside the boiler, a pipe passing out from the boiler below the water-level extended for some distance downward and afterward upward to a distance above the water-level and there brought into contiguity with the thermostat so as to be capable of heating it, then extended downward into the boiler and terminated at the water-level and a valve controlling the supply of feed-water to the boiler opened and closed by the action of the thermostat.

6. The combination of a steam-boiler, thermostatic apparatus outside the boiler, a pipe passing out from the boiler below the water-level extended for some distance downward and afterward upward to a distance above the water-level and there brought into contiguity with the thermostat so as to be capable of heating it, then extended downward into the boiler and terminated at the water-level and a valve controlling the supply of feed-water to the boiler opened and closed by the action of the thermostat, and a jacket surrounding some portion of the pipe which is below the water-level and means for passing feed-water through this jacket and into the boiler.

7. The combination of a steam-boiler, a vessel containing vaporizable liquid outside the boiler, a pipe passing out from the boiler below the water-level extended for some distance downward and afterward upward to a distance above the water-level and brought into contact with the vaporizable liquid and then extended downward into the boiler and terminated at the water-level, a closed case filled with liquid and capable of altering its form when the liquid within it is subjected to pressure a pipe also filled with liquid connecting the case with the annular vessel and a valve controlling the supply of feed-water to the boiler opened and closed by the case when it alters in form.

8. The combination of a steam-boiler, a vessel containing vaporizable liquid outside the boiler, a pipe passing out from the boiler below the water-level extended for some distance downward and afterward upward to a distance above the water-level and brought into contact with the vaporizable liquid and then extended downward into the boiler and terminated at the water-level, a closed case filled with liquid and capable of altering its form when the liquid within it is subjected to pressure a pipe also filled with liquid connecting the case with the annular vessel and a valve controlling the supply of feed-water to the boiler opened and closed by the case when it alters in form, and a jacket surrounding some portion of the pipe which is below the water-level and means for passing feed-water through this jacket and into the boiler.

9. The combination of a steam-boiler, a closed vessel containing vaporizable liquid outside the boiler, means for bringing steam from the boiler into contact with the closed vessel whenever the water-level in the boiler gets too low, two or more expansible cases $h$ filled with liquid one above the other, a readily-yielding pipe connecting each of these cases with the closed vessel, the feed-water-supply passage $v$, the valve $u$ capable of closing this passage but opened by the expansion of the cases $h$ and the relief-valve $x$ on the feed-water-supply passage.

10. The combination of a steam-boiler, a closed vessel containing vaporizable liquid outside the boiler, means for bringing steam from the boiler into contact with the closed vessel whenever the water-level in the boiler gets too low, two or more expansible cases $h$ filled with liquid one above the other, a readily-yielding pipe connecting each of these cases with the closed vessel, the feed-water-supply passage $v$, the valve $u$ capable of closing this passage but opened by the expansion of the cases $h$ and the relief-valve $x$ on the feed-water-supply passage, and the plunger $y$ of same diameter as the valve-seat caused to press against the valve by the pressure of steam from the boiler acting upon it aided by a spring.

11. The combination of a steam-boiler, a closed vessel containing vaporizable liquid outside the boiler, means for bringing steam from the boiler into contact with the closed vessel whenever the water-level in the boiler gets too low, two or more expansible cases $h$ filled with liquid one above the other, a readily-yielding pipe connecting each of these cases with the closed vessel, the feed-water-supply passage $v$, the valve $u$ capable of closing this passage but opened by the expansion of the cases $h$ and the relief-valve $x$ on the feed-water-supply passage, and the plunger $y$ of same diameter as the valve-seat caused to press against the valve by the pressure of steam from the boiler acting upon it aided by a spring, and a steam-valve more or less shutting off steam from a steam feed-water-supply pump whenever the relief-valve opens.

12. The combination of two or more steam-boilers, a feed-water-supply pump, a feed-water-supply pipe supplied with feed-water by the pump, a branch pipe passing from the supply-pipe to each boiler, thermostatic apparatus outside each boiler, means for bringing steam from the boiler into contact with the closed vessel which is outside it whenever the water-level in the boiler gets too low, a valve capable of closing the branch passage from the supply-pipe to the boiler but opened by the thermostatic apparatus when this apparatus is heated by steam from the boiler and a relief-valve on the feed-water-supply pipe to allow of the escape of feed-water when the amount of feed-water supplied by the pump is in excess of that required by the several boilers.

13. The combination of two or more steam-boilers, a feed-water-supply pump, a feed-water-supply pipe supplied with feed-water by the pump, a branch pipe passing from the supply-pipe to each boiler, a closed vessel containing vaporizable liquid outside each boiler, means for bringing steam from the boiler into contact with the closed vessel which is outside it whenever the water-level in the boiler gets too low, a case filled with liquid and capable of altering its form when the liquid within it is subjected to pressure, a pipe also filled with liquid connecting the case with the closed vessel, a valve capable of closing the branch passage from the supply-pipe to the boiler but opened by the case when it alters its form on the liquid within it being put under pressure, and a relief-valve on the feed-water-supply pipe to allow of the escape of feed-water when the amount of feed-water supplied by the pump is in excess of that required by the several boilers.

14. The combination of a steam feed-water-supply pump supplying feed-water to a feed-water-supply pipe, a relief-valve on this pipe, a steam-cut-off valve acted on by the relief-valve in such manner that when the relief-valve opens, the cut-off valve more or less closes and more or less cuts off steam from the steam feed-water-supply pump.

HENRY ALBERT FLEUSS.

Witnesses:
JOHN H. WHITEHEAD,
FREDK. C. WEATHERLY.